US007668782B1

(12) United States Patent  (10) Patent No.: US 7,668,782 B1
Reistad et al.  (45) Date of Patent: Feb. 23, 2010

(54) ELECTRONIC COMMERCE SYSTEM FOR OFFER AND ACCEPTANCE NEGOTIATION WITH ENCRYPTION

(75) Inventors: Brian J. Reistad, Sudbury, MA (US); Eswar Priyadarshan, Worcester, MA (US); Michael P. Mitchell, Belmont, MA (US); Jim W. O'Toole, Somerville, MA (US); Andrew C. Payne, Lincoln, MA (US); Durval M. Vieira, Peabody, MA (US); Larry C. Stewart, Burlington, MA (US)

(73) Assignee: Soverain Software LLC, Chicago, IL (US)

( * ) Notice: Subject to any disclaimer, the term of this patent is extended or adjusted under 35 U.S.C. 154(b) by 832 days.

(21) Appl. No.: 09/054,180

(22) Filed: Apr. 1, 1998

(51) Int. Cl.
G06F 17/60 (2006.01)
(52) U.S. Cl. ...................................................... 705/50
(58) Field of Classification Search .................. 705/44, 705/37, 26, 64, 65, 66, 80, 28, 27, 39, 50; 340/825.31, 825.34, 825.35; 707/4; 380/4
See application file for complete search history.

(56) References Cited

U.S. PATENT DOCUMENTS

| | | | | |
|---|---|---|---|---|
| 5,056,019 A * | 10/1991 | Schultz et al. | ................. | 705/14 |
| 5,557,780 A * | 9/1996 | Edwards et al. | ............. | 395/500 |
| 5,710,886 A * | 1/1998 | Christensen et al. | .......... | 705/14 |
| 5,710,887 A * | 1/1998 | Chelliah et al. | ................ | 705/26 |
| 5,717,989 A * | 2/1998 | Tozzoli et al. | .................. | 705/37 |
| 5,724,424 A * | 3/1998 | Gifford | ......................... | 380/24 |
| 5,774,870 A * | 6/1998 | Storey | .......................... | 705/14 |
| 5,794,207 A * | 8/1998 | Walker et al. | .................. | 705/26 |
| 5,794,210 A * | 8/1998 | Goldhaber et al. | ............. | 705/14 |
| 5,794,234 A * | 8/1998 | Church et al. | ................... | 707/4 |
| 5,799,285 A * | 8/1998 | Klingman | ..................... | 705/26 |
| 5,809,144 A * | 9/1998 | Sirbu et al. | ..................... | 705/26 |
| 5,855,007 A * | 12/1998 | Jovicic et al. | .................. | 705/14 |
| 5,860,068 A * | 1/1999 | Cook | ............................ | 705/26 |
| 5,873,071 A * | 2/1999 | Ferstenberg et al. | ........... | 705/37 |
| 5,898,781 A * | 4/1999 | Shanton | ........................ | 380/25 |
| 5,903,652 A * | 5/1999 | Mital | ......................... | 705/26 X |
| 5,903,882 A * | 5/1999 | Asay et al. | ..................... | 705/44 |
| 5,909,492 A * | 6/1999 | Payne et al. | .................... | 380/24 |
| 6,005,935 A * | 12/1999 | Civanlar | ....................... | 705/51 |
| 6,005,945 A * | 12/1999 | Whitehouse | ................. | 380/51 |
| 6,057,872 A * | 5/2000 | Candelore | ..................... | 725/23 |
| 6,175,922 B1 * | 1/2001 | Wang | ......................... | 713/182 |
| 6,321,208 B1 * | 11/2001 | Barnett et al. | .................. | 705/14 |
| 6,336,098 B1 * | 1/2002 | Fortenberry et al. | ........... | 705/14 |
| 6,385,731 B2 * | 5/2002 | Ananda | .......................... | 726/6 |
| 2002/0002485 A1 * | 1/2002 | O'Brien et al. | ................ | 705/14 |
| 2002/0046107 A1 * | 4/2002 | Marshall et al. | ................ | 705/14 |
| 2002/0194069 A1 * | 12/2002 | Thakur et al. | .................. | 705/14 |
| 2003/0037072 A1 * | 2/2003 | Bowman et al. | ............. | 707/201 |

* cited by examiner

*Primary Examiner*—Pierre E Elisca
(74) *Attorney, Agent, or Firm*—Jones Day

(57) ABSTRACT

An electronic commerce system includes a client computer and a server computer interconnected by a public packet switched communications network. The client computer is programmed to transmit to the server computer an order acceptance request that includes a plurality of terms or conditions of a proposed offer for a purchase, including multiple options of at least one of the terms or conditions of the offer. The server computer is programmed to process the order acceptance request based on pre-programmed criteria and, based on the processing of the order acceptance request, to transmit to the client computer an order acceptance response that includes a plurality of amendments to the proposed offer for the purchase, including selection of an option of the at least one of the terms or conditions.

50 Claims, 7 Drawing Sheets

ELECTRONIC COMMERCE SYSTEM FOR OFFER AND ACCEPTANCE NEGOTIATION WITH ENCRYPTION

REFERENCE TO MICROFICHE

Microfiche Appendices A (one microfiche; 18 frames) and B (three microfiche; 448 frames) are included with this patent application.

BACKGROUND OF THE INVENTION

This invention relates to electronic commerce systems implemented using public packet switched communications networks.

U.S. Pat. No. 5,724,424, the entire disclosure of which is hereby incorporated herein by reference, filed Dec. 16, 1993 by David K. Gifford and issued on Mar. 3, 1998, discloses an electronic commerce system that allows buyer computers to purchase goods or information from merchant computers over a public packet switched communications networks. The merchant computers cause electronic documents to be sent to buyer computers containing forms that buyers can fill out and return to the merchant computers to request purchases. A payment computer obtains authorization of payment orders for purchases in real time from an external financial authorization network.

SUMMARY OF THE INVENTION

One aspect of the invention provides an electronic commerce system that includes a client computer and a server computer interconnected by a public packet switched communications network. The client computer is programmed to transmit to the server computer an order acceptance request that includes a plurality of terms or conditions of a proposed offer for a purchase, including multiple options of at least one of the terms or conditions of the offer. The server computer is programmed to process the order acceptance request based on pre-programmed criteria and, based on the processing of the order acceptance request, to transmit to the client computer an order acceptance response that includes amendment to the proposed offer for the purchase. The amendment includes selection of an option of the at least one of the terms or conditions.

According to another aspect of the invention, the order acceptance response includes a plurality of amendments to the proposed offer for the purchase.

According to another aspect of the invention, the order acceptance request includes a plurality of modular elements individually protected by cryptographic security codes. The server computer is programmed to authenticate the cryptographic security codes and to examine the modular elements individually protected by the cryptographic security codes.

According to another aspect of the invention, the processing of the order acceptance request is performed by a controller module that handles processing of the order acceptance request that is primarily not specific to a particular application of the electronic commerce system to which the order acceptance request pertains, and that initiates a plurality of calls to a plurality of plug-in modules. The plug-in modules handle processing of the order acceptance request that is primarily specific to the particular application of the electronic commerce system, and can be readily replaced by different plug-in modules that handle processing primarily specific to different applications of the electronic commerce system.

According to another aspect of the invention, the server computer further is programmed to handle fraud-avoidance processing of the order acceptance request based on contents of the order acceptance request other than price, purchaser identity, and seller identity.

According to another aspect of the invention, the server transmits to the client computer an order acceptance response comprising amendment to the proposed offer for the purchase, where the amendment includes an amended price based on terms or conditions recited in the order acceptance request that are less than optimal based on the pre-programmed criteria.

According to another aspect of the invention, the server initiates a call to a database of a virtual warehouse in which merchants store virtual inventories of items, to ensure that a sufficient virtual inventory exists for the purchase.

According to another aspect of the invention, one of the client computers is programmed to transmit to the server computer a first order acceptance request that includes a plurality of terms or conditions of a proposed offer for a purchase of a gift certificate. Another of the client computers is programmed to transmit a second order acceptance request that includes the gift certificate. The server computer is programmed to store gift certificate information in a database when it receives the first order acceptance request and to examine the database when the server computer receives the second order acceptance request.

According to another aspect of the invention, the proposed offer is for a purchase of tokens to be redeemed for micro-purchases, and the server computer is programmed to increase a number of tokens in a token database that are available for use in exchange for the micro-purchases.

According to another aspect of the invention, the proposed offer is for a purchase of a subscription, and the server is programmed to update a subscription table in order to reflect the purchase of the subscription.

Numerous additional features and advantages of the invention will become apparent from the detailed description, drawings, and claims.

DETAILED DESCRIPTION

Figure 1:
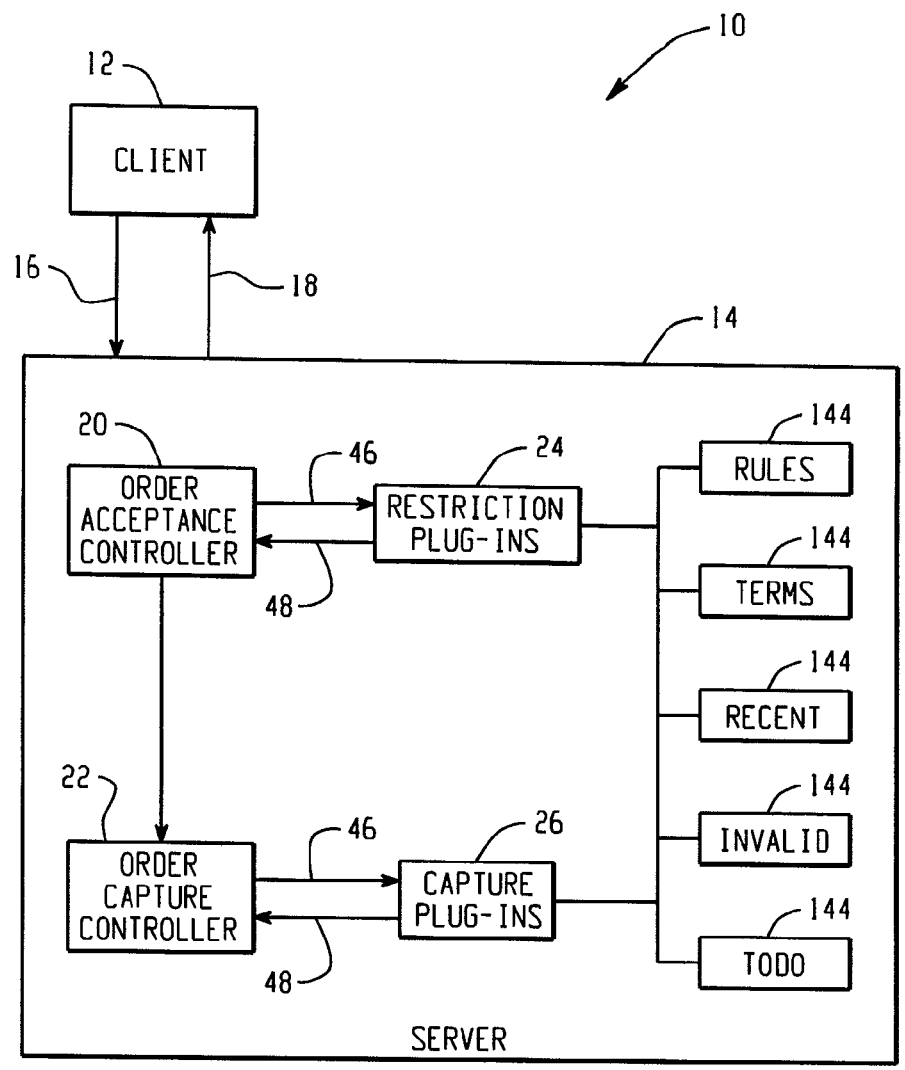
FIG. 1 is a block diagram of an electronic commerce system according to the invention.

With reference to FIG. 1, the invention provides an electronic commerce system 10 that enables automated processing of on-line orders using advanced order acceptability criteria. The electronic commerce system negotiates with client computers 12, which may be operated, for example, by buyers who wish to purchase goods or services, or by agents who make purchase for or make sales to buyers. Once the negotiation phase is complete, or independently thereof, the electronic commerce system can enter a transaction phase in which an order by client computer 12 for goods or services to be delivered by a seller is "captured" by server 14.

According to the negotiated order acceptance protocol of electronic commerce system 10, client computer 12 first sends an order acceptance request message 16 to server 14. Order acceptance request 16 may contain information identifying the buyer (which may or may not be the client), the seller, the goods, products, or services that the buyer wishes to purchase, optional information describing terms or conditions of the purchasing transaction that the client considers desirable, and unique order-identifying information for use by client computer 12 and server 14 to speed order processing and for use in identifying the order in other related protocols. Such terms or conditions may include intended means of payment, time of payment, payment guarantee conditions, shipping methods, time and place of delivery, insurance coverage, risk-of-loss provisions, cancellation policies, goods acceptance criteria, and other terms. In a particular embodiment, header files useful in implementing the protocol described above are shown in portions of Microfiche Appendix B.

Server 14 processes order acceptance request 16 and generates an order acceptance response 18 containing the original order acceptance request amended to indicate the terms or conditions acceptable to server 14 and which may contain unique order-identifying information. These amendments signify that certain terms or conditions specified in, or omitted from, order acceptance request 16 constitute violations of the server's order acceptance criteria. The amendments include a list of specific order acceptance criteria, each of which indicates specifically the section of the original order acceptance request to which it refers and indicates alternative choices that would be acceptable to server 14. An amendment may indicate that server 14 rejects a specific term or condition and may contain a menu of proposed replacement terms, or an amendment may refer to an element of the proposed order that was omitted from order acceptance request 16 and may propose a menu of acceptable terms or conditions for that element.

Order acceptance request 16 may optionally contain client approval status information. For example, the client approval status information may indicate that the client wishes to obtain the server's opinion of order acceptance request 16, to be expressed in the form of an order acceptance response 18 that includes remarks from server 14, as part of the negotiation phase of the electronic commerce transaction. Upon receipt of order acceptance response 18 from server 14, the client is free to abandon the transaction, to incorporate the server's changes into a new order acceptance request, or to change the original order acceptance request in a different way. Client computer 12 and server 14 negotiate until the client is ready come to an agreement. At this point, client computer 12 can enter the transaction phase of the electronic commerce transaction by indicating in the client approval status information that if order acceptance request 16 is acceptable to server 14, the server should "capture" it for client computer 12. If order acceptance request 16 contains no violations of the server's acceptance criteria and the client approval status information indicates that the client desires the order acceptance request 16 to be accepted immediately, server 14 will attempt to "capture" order acceptance request 16, thereby completing the electronic commerce transaction. There can also be other states of the client approval status information that will cause server 14 to attempt to capture order acceptance request 16 if it contains no violations of the server's acceptance criteria (for example, the client approval status information may indicate that the client desires immediate capturing of order acceptance request 16 provided that the client's manager also approves).

The protocol described above enables an automatic negotiation of a commercial transaction between a buyer and a seller or between a client computer operating on behalf of a buyer and a server computer operating on behalf of a seller, where the server computer contains software that must enforce complex order acceptance criteria. The protocol enables the client computer and the server to efficiently negotiate toward a complete and acceptable order because the protocol communicates multiple acceptability criteria between the client computer and the server in each message. For example, order acceptance request 16 can contain multiple terms or conditions options to be filtered by the server, and order acceptance response 18 can contain multiple amendments indicating violations of acceptability criteria. Also, order acceptance response 18 can include a higher total order price that would be acceptable to server 14 in order for server 14 to accept the terms or conditions of the original order acceptance request, or, alternatively, a lower total order price for compensating the client as an inducement for accepting different terms or conditions in order to avoid violating the acceptability criteria, and thus server 14 can implement order-dependent, negotiated hidden pricing. More generally, order acceptance response 18 can include a plurality of various order prices corresponding to various terms or conditions of the offer.

As an example of one implementation of the protocol, in the negotiation phase of an electronic commerce transaction in which the client is a buyer (as opposed to the client being a party that interacts in turn with the buyer), the buyer may click on a digital offer presented by a catalog server to the buyer as an HTML document on a web site, as described in the above-mentioned U.S. Pat. No. 5,724,424, and the buyer receives an order form that identifies the item the buyer might wish to purchase, its price, shipping choices, and payment choices. The buyer can provide billing information in blank boxes on the form, and the buyer might have the option of choosing a different shipper or a different payment instrument. The buyer can then click on a "recalculate" button on the order form which causes the buyer's order acceptance request 16, in the form of an order document indicating what the buyer would like the transaction to be, to be presented to the electronic commerce software.

By clicking on the "recalculate" button, the buyer causes the client approval status information in order acceptance request 16 to indicate that the buyer seeks the server's opinion of order acceptance request 16, to be expressed in the form of an order acceptance response 18 including remarks from server 14. Alternatively, by clicking on a "buy now" button on the form, the buyer causes the client approval status information to indicate that if order acceptance request 16 is acceptable to server 14, the server should "capture" it for the buyer.

The negotiation phase is driven by the client (in the above case the client is the buyer) in that server 14 cannot accept an order acceptance request 16 unless client computer 12 specifically requests that the server do so. If, for example, client computer 12 submits to server 14 an order acceptance request 16 in which the client approval status information indicates that client computer 12 requests an order acceptance response 18 in the form of a quote or containing tax and shipping options, charges, payment choices, etc., server 14 cannot accept the client's order acceptance request 16. On the other hand, client computer 12 can submit to server 14 an order acceptance request 16 in which the client approval status information indicates that if it is acceptable to server 14, the server may accept it by "capturing" it.

Order acceptance request 16 and order acceptance response 18 are communicated in an extensible structured message format having a variable set of fields, such as XML (extensible markup language) or SGML. In one embodiment the messages would be communicated between client computer 12 and server 14 using a two-way-authenticated connection, for example an SSL connection using a shared key known to client computer 12 and server 14. Alternatively, identities can be established through the use of certificates. In other alternative embodiments order acceptance request 16 and order acceptance response 18 are encoded and decoded using well-known encoding and decoding techniques. Order acceptance request 16 and order acceptance response 18 may also contain information that has been digitally signed or authenticate. The integrity of modular elements of order acceptance request 16 and order acceptance response 18 can be separately protected by protection codes embedded within the protected modular element. The protection codes can be implemented using digital signatures or message authentication codes or other well-known cryptographic security techniques. The embedding of these codes within modular elements of the messages enables client computer 12 and server 14 to efficiently store and forward the modular elements together with their protection codes. For example, an order acceptance request 16 may contain a digital coupon, protected by a protection code, that client computer 12 has obtained from a third party. Applications of such digital coupons in the context of electronic commerce system 10 are described in more detail below.

The negotiation phase involves an exchange of documents that can contain a wealth of information. For example, an order acceptance response 18 to client computer 12 can include a list of acceptable payment choices, a list of possible shipping options, error messages, the results of tax computations, and the result of shipping computations.

The electronic commerce software automatically performs the functions of a seller during the negotiation phase. Because the software does not require a single module to handle all of the seller's functions, the seller can add its own modules to the software at will in order to cause additional negotiation functions to be performed. For example, a seller can add modules to the software that perform inventory control, fraud checking, rejection of orders to P.O. boxes, notification to fulfillment houses, etc.

The architecture of the electronic commerce software, which runs on server 14, includes an order acceptance controller 20 and an order capture controller 22 that exchange information with client computer 12.

In an electronic commerce transaction in which the client is a buyer, server 14 may cause an order form HTML document to be displayed to a buyer by way of a web browser on the buyer's personal computer. The order form is an electronic representation of a paper form that can include empty spaces for the buyer's name, the buyer's billing address, the item or items to be purchased, the price for each item, the shipping method or methods preferred by the buyer, the payment method or methods preferred by the buyer, and so on, analogous to an order form from a department store catalog. Server 14 receives the completed order form and uses the information contained therein and the date to construct an order acceptance request 16 for consideration by order acceptance controller 20 and order capture controller 22.

Order acceptance controller 20 and order capture controller 22 represent the seller. Order acceptance controller 20 is responsible for calculating or checking taxes, shipping methods, coupons, payment options (such as different credit cards, purchase orders), etc., and order capture controller 22 is responsible for completing a transaction that has been accepted by order acceptance controller 20.

In the above-described situations in which the client is a buyer, server 14 transmits order forms to and receives order forms from client computer 12 using software at server 14 that interfaces with order acceptance controller 20 and order capture controller 22 through an order entry API (application program interface). It is also possible, however, for client computer 12 to interface directly with order acceptance controller 20 and order capture controller 22 through the order entry API, which specifies the protocol by which client computers and servers communicate about orders according to an agreed-to terminology. By virtue of this architecture, the seller or a third party is free to construct software at client computer 12 that interfaces with the order entry API and that allows a buyer to fill out an order form that can be very different from the order forms that happen to be provided by electronic commerce software (not shown in the figures) residing on server 14. This architecture accommodates sellers or third parties that don't like the order form provided by server 14 or who prefer to integrate the order composition process in a manner that does not even necessarily involve presenting an order form to the buyer. For example, the seller or third party might set up a question and answer interview with the buyer to create the order.

Thus, the seller or a third party might want to provide a user interface to the buyer that is different from the user interface that can be provided by server 14. The order entry API lets the seller or third party create that user interface. The seller or third party still must collect the same information that is requested by order acceptance controller 20 and order capture controller 22, but the seller or third party can choose to ask questions of the buyer in a different order, or can choose not to present some options to the buyer and instead pick the options on behalf of the buyer.

For example, one implementation involves a 1-800 number that a buyer can call and speak with an operator who acts as a proxy for the buyer. The 1-800 company functions as a client of the electronic commerce system. The operator might need to use an internal ordering system that is arranged in a particular format and that does not correspond with the default user interface. The seller can provide a different user interface to the operator of the 1-800 number by providing appropriate software at the client computer.

If a buyer wishes to purchase a new automobile, for example, the buyer could call such a 1-800 number and place an order for a particular type of automobile. The client computer at the 1-800 company can automatically generate, based on the input from the buyer, one of a number of different order forms, depending upon the type of automobile selected by the buyer. The different types of order forms are compatible with different order acceptance controllers and order capture controllers operated by different automobile companies. This arrangement allows a buyer who might be uncertain as to what type of automobile to buy to call an independent person whose service is to offer a one-stop location at which the buyer can propose offers on different types of automobiles manufactured by different companies.

Likewise, a buyer might call a travel agency that can sell the buyer a hotel room, a plane flight, and golf times, and the travel agency (which functions as a client of the electronic commerce system) will parcel the information provided by the buyer into a number of separate orders that the travel agency sends to a hotel, an airline, and a golf course.

Thus, the order entry API functions as a connection point where clients (such as the 1-800 company and travel agency described above) and sellers can meet in a manner that is independent of a particular user interface. There can be many possible user interfaces that people can create on their own. For example, a consumer magazine company that evaluates products might decide to get into the business of allowing visitors to their web site to place orders for products such as automotive vehicles. The consumer magazine company acts as a client of the electronic commerce system. Part of the value of the web site is to assist a buyer in deciding what to purchase. When the buyer has decided what to purchase, the web site can provide the buyer with an order form that has been custom tailored by the consumer magazine company. The order form allows a buyer to identify constraints such as: a vehicle that is four wheel drive, that is two-door as opposed to four-door, that is black, that gets certain gas mileage. The consumer magazine company's client computer can then communicate with order acceptance controllers and order capture controllers maintained by different truck manufacturers by generating calls through the order entry API's of the manufacturers, in order to identify, through a negotiation process of the type described above, all of the possible options for the buyer subject to the constraints specified by the buyer. After the negotiation process is complete, the consumer magazine company can send an order to the vendor and get the vendor to actually accept the order.

The client computer described above need not necessarily be operated by an agent for the buyer (in the case where the client is an entity other than the buyer), but could instead consist of the buyer's own computer operating custom software sold by a vendor (in the case where the client is the buyer). The electronic commerce systems does not require a seller to trust that the client computer is correctly calculating the terms and conditions for the order (such as the tax), because those terms are enforced by the seller's server 14. The buyer's computer may choose to perform some of these calculations in order to provide a highly interactive and responsive user interface for a client, but in this electronic commerce system, those calculations are always double-checked (or enforced) during the order negotiation phase of operation of the seller's server 14.

Order acceptance controller 20 determines whether an order acceptance request 16 from client computer 12 is acceptable and sends an order acceptance response 18 to client computer 12, and order capture controller 22 accepts an order from a client computer 12 after the negotiation process is complete. When client computer 12 submits an order acceptance request 16 that requests an order acceptance response 18 or further information (for example, by virtue of a buyer clicking on a "recalculate" button), order acceptance controller 20 is run alone, but when client computer 12 submits an order acceptance request 16 that indicates that if order acceptance request 16 is acceptable server 14 should capture it for client computer 12 (for example, by virtue of a buyer clicking on a "buy now" button), order capture controller 22 is run, which in turn calls order acceptance controller 20.

Order acceptance controller 20 and order capture controller 22 include, in one particular embodiment, a specific series of predetermined steps combined with various points for call-outs 46 to optional custom modular plug-in components 24 and 26 that can be supplied by the operator of the software and that operate at server 14 or other servers connected to server 14. Microfiche Appendix A includes source code interface definitions for the call-out points for this particular embodiment. Plug-ins 24, 26 provide a modular acceptance pipeline for negotiating and capturing orders in an efficient manner that accommodates the processing of detailed information concerning possible order acceptance violations. Plug-ins 24, 26 can interface with various databases 44 that store various rules, agreement terms, recent activity statistics, offer invalidity conditions, and "to do" instructions. Plug-ins 24, 26 use the information stored in databases 44 in formulating responses 48, to call outs 46. At each call-out point in order acceptance controller 20 and order capture controller 22, the controller either branches to a custom software plug-in 24, 26 added by the operator of the software or, if there is no such plug-in 24, 26 the controller simply continues with the predetermined steps. There can be an arbitrary number of plug-ins 24, 26 at each call-out point, which can be called in an arbitrary order or in an order determined by programming of server 14. If a plug-in fails to respond or responds by indicating that its operation has failed, order acceptance controller 20 or order capture controller 22 may respond to client computer 12 with an error notification or may re-try the call to the plug-in. In general, plug-ins performs functions such as preventing capture of an order acceptance request until a later order acceptance request for the same order contains terms or conditions acceptable to the plug-in. The behavior of a plug-in, including whether the plug-in performs any function at all, and including its setting of terms or conditions (including prices) or its overall negotiation strategy, may depend on the content of the order acceptance request, including, for example, the presence or absence of certain types of coupons, specific information identifying a buyer or seller (authenticated or non-authenticated) or identifying a relationship between buyer and seller, specific types of goods, products or services, or specific terms or conditions specified in the order acceptance request.

Figure 2:
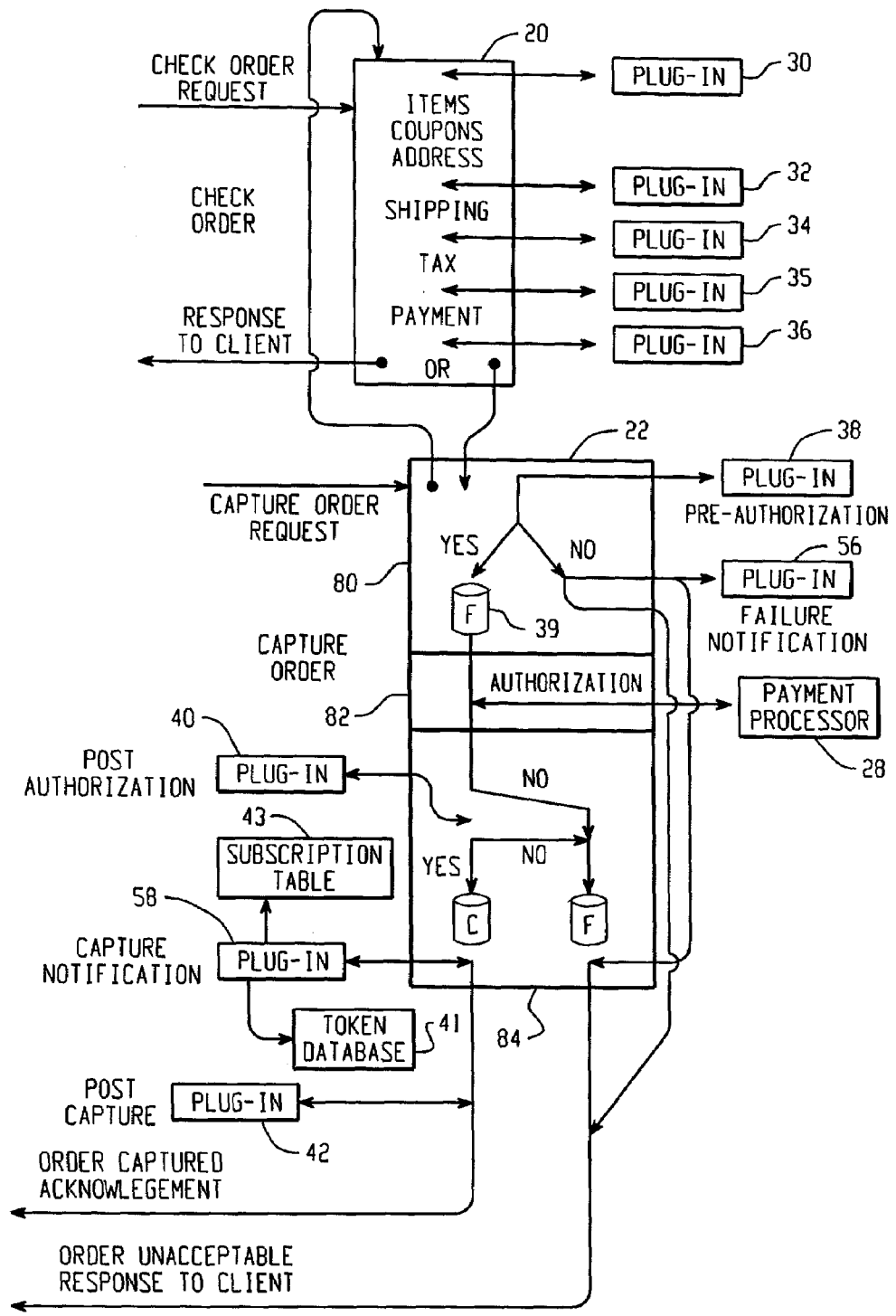
FIG. 2 is a flow-chart diagram of the order acceptance controller and order capture controller of the electronic commerce system of FIG. 1.

For example, with reference to FIG. 2, the seller can insert a restriction plug-in component 30 that performs inventory control. Thus, if a client proposes to purchase a particular model of an automobile in a particular color, and there is only one such automobile that is available, restriction plug-in component 30 might cause order acceptance controller 20 to send the client computer an order acceptance response indicating that the automobile is available for a certain price and it will be reserved for the client computer as long as the client computer purchases the automobile within a certain amount of time. The plug-in component's response would be generated automatically based on some predetermined set of criteria.

In other words, order acceptance controller 20 does not itself provide inventory control, but instead provides a gateway point in the middle of the program logic that allows the operator of the software to make an external call out to an item check restriction plug-in 30 to determine whether that inventory exists so that order acceptance controller 20 may respond appropriately. If the operator of the software does not provide an item check plug-in 30 to order acceptance controller 20, on the other hand, order acceptance controller 20 will simply assumes that the product is readily available and will respond to a client's order acceptance request in accordance with a predetermined set of criteria that has nothing to do with inventory. In this case, if order acceptance controller 20 accepts an order from a client computer, the seller may need to notify the client at some later point in time (by mail for example) of the availability or unavailability of the product.

If the operator of the software does not install any restriction plug-ins, order acceptance controller 20 will operate as follows. When order acceptance controller 20 receives an order acceptance request from a client computer, order acceptance controller 20 performs an item check by looking up the item requested by the client computer and its price and calculating the total amount due based on the quantity requested by the client computer. Then order acceptance controller 20 processes any digital coupons that might be presented by the client computer, in accordance with the techniques described in U.S. patent application Ser. No. 08/741,862, the entire disclosure of which is hereby incorporated herein by reference, filed Oct. 29, 1996 by James W. O'Toole, Jr. et al. and corresponding to PCT Patent Publication WO98/19224. Next, order acceptance controller 20 verifies the billing and shipping addresses specified by the client computer (for example, order acceptance controller 20 determines whether the U.S. Postal Zip Code specified by the client computer matches the city specified by the client computer). Order acceptance controller 20 then performs shipping computation, tax computation (computation of U.S. sales tax, Canadian tax, U.K tax, etc.), and then a payment check to ensure that the client computer has supplied an acceptable payment instrument. If the order acceptance request specifies multiple shipping methods or multiple payment methods that are acceptable to the client, order acceptance controller 20 can select the shipping method or payment instrument most acceptable to order acceptance controller 20 (assuming at least one shipping method or payment instrument is indeed acceptable).

The operator of the software may arrange for a call to be made to one or more item check plug-ins 30 immediately before order acceptance controller 20 performs the standard item check. One type of item check plug-in 30 would be an inventory check plug-in as described above. Another item check plug-in 30 might modify the response of order acceptance controller 20 by, for example, factoring in a reduced per-unit price if the client orders a certain quantity of a particular item or modifying the order acceptance response to suggest to the client that the client might want to take advantage of such a reduced per-unit price by buying the requisite quantity. Likewise, item check plug-in 30 might factor in any special offers that might be applicable on a particular day, or might cause the order acceptance response produced by order acceptance controller 20 to identify a component that the client will receive for free if the client purchases a particular product, or might cause the order acceptance response to inquire whether the client wishes to purchase Product C given that the client has proposed to purchase Product A and Product B, or might cause the client's order acceptance request to be rejected if the client is prohibited from ordering more than a certain number of a particular item and cause the order acceptance response to indicate the reason for rejection, etc. The behavior of the plug-in, including whether the plug-in performs any function at all, may depend on whether a coupon is present in the offer acceptance request or on the type of coupon that is present.

After order acceptance controller 20 performs coupon checking and address checking but before it performs shipping computations, order acceptance controller 20 may call out to another plug-in 32 provided by the operator of the software. Ordinarily, a digital coupon object may be used by any party possessing the coupon, as described in the above-referenced U.S. patent application Ser. No. 08/741,862. The plug-in 32 may, however, reject a coupon if someone other than a particular person who is authorized to use the coupon attempts to use the coupon, or if the coupon object contains a serial number to ensure it is used only once and the plug-in 32 determines that the coupon has been used previously, etc. The plug-in may be able to reject the coupon, for example, because the plug-in can know the identity of the client (because the client computer's authority has been authenticated, for example, by virtue of the use of a two-way-authenticated SSL connection) and the plug-in can know whether that client can be trusted to provide accurate information concerning the identity of a coupon holder. Alternative methods of identification of the client include basic authentication and client certificates.

A plug-in 34 after the predetermined shipping computations can be used either to add or to subtract shipping choices, or to change the calculation of the shipping cost, or to place a call to a shipping company to obtain a tracking number to be included in the order acceptance controller's response to the client computer along with the date of shipment so as to allow the client to make inquiries to the shipping company. A plug-in 35 after the tax check can be used to perform some sort of general checking of the order acceptance request to ensure that the order acceptance request is acceptable, such as checking tax values and the total cost of the order. A plug-in 36 after the payment check can be used to perform some other sort of general checking of the order acceptance request, such as checking whether the proposed method of payment is acceptable for the item requested by the client. In general, each restriction plug-in can affect the results of previous steps only. Each restriction plug-in need not necessarily apply specifically to the results of immediately previous predetermined step alone, but could instead apply to the combined results of more than one previous step. Certain restriction plug-ins can be implemented with "restricted interests," so that they do not perform any function unless certain terms, conditions, or digitally authenticated objects are present in the order acceptance request. Order acceptance controller 20 encodes all of the comments and acceptability violations generated by the restriction plug-ins or order acceptance controller 20 into the order acceptance response, using standard error codes. The comments and acceptability violations serve as instructions for user-interface modules at the client computer in order to facilitate interactive ordering by the client computer by allowing the client computer to quickly correct the order to make it acceptable.

Figure 3:
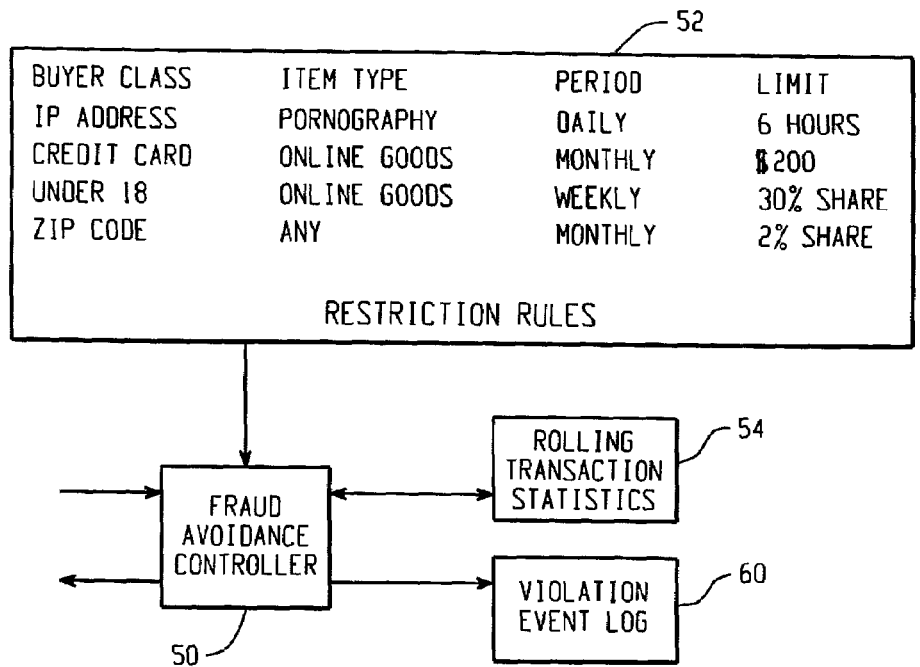
FIG. 3 is a block diagram of a fraud avoidance controller system for use in the electronic commerce system of FIG. 1.

One form of restriction plug-in 36 that can be implemented after the payment check step is an order-dependent fraud avoidance controller. As shown in FIG. 3, fraud avoidance controller 50 interfaces with a rules database 52 that contains various acceptability restriction rules as to which buyer classes are allowed to obtain which types of items and as to limits on the particular types of items that members of particular buying classes are allowed to purchase per period of time. Rules database 52 stores information pertaining to buyer identity, payment means, buyer network contact information (IP address, Email address, etc.), specific items being ordered, delivery address, and other seller-authenticated membership information, credit information, and relationship rating information supplied with the order acceptance request. Such information can be authenticated by the order acceptance controller by authenticating a protection code embedded within a modular element of the order acceptance request that contains the information. Fraud avoidance controller 50 also interfaces with a rolling transaction statistics database 54 in which fraud avoidance controller 50 stores information pertaining to each order in a statistical profile keyed by item, type of item, buyer identity, buyer location, buyer pseudo-identity, buyer cyberspace pseudo-location, or type of equipment or software used by the client source or transmission path, along with an indication whether the order was accepted, rejected, or processed to test acceptance prior to final buyer approval (fraud avoidance controller obtains information concerning acceptances and rejections from the failure notification module and capture notification module described below). Fraud avoidance controller 50 compares each current order acceptance request to rolling transaction statistics database 54, and if the current order acceptance request or violates any maximum transaction rates as defined in restriction rules database 52, or otherwise violates any transaction rule in restriction rules database 52, then fraud avoidance controller 50 logs an event in violation event log 60 and may also cause the order acceptance request to be rejected.

When the client computer submits an order acceptance request 16 and indicates that if the order acceptance request is acceptable the server should capture it for the client, order capture controller 22 first causes order acceptance controller 20 to run to ensure that there are no problems with the order acceptance request. Then, if the response of order acceptance controller 20 indicates that the order acceptance request is acceptable, order capture controller 22 proceeds through three database sub-transactions. The first sub-transaction 80 is a pre-authorization call to a custom capture plug-in 38 supplied by the operator of the software that might do some sort of expensive checking procedure that the operator of the software does not wish to perform during the order acceptance process. The pre-authorization call is followed by writing the order acceptance request into a database 39 if the results of the checking procedure performed by plug-in 38 are favorable or by calling a failure notification plug-in 56 to provide notification that the order acceptance request has failed. The second sub-transaction 82 involves a call to a payment processor 28, such as the processor of a credit card company, to obtain authorization for the overall transaction, in the manner described in the above-mentioned U.S. Pat. No. 5,724,424. The client may be able to select the payment processor that is used by identifying its preferred payment method (for example, a particular credit card company) in the order acceptance request, provided that the preferred payment method is acceptable to the server. In the third sub-transaction 84 performed by order capture controller 22, if the overall transaction is not authorized by the payment processor, or if any capture plug-in 38 generates an acceptability violation, order capture controller 22 marks the transaction as being failed, calls out to a failure notification plug-in 56 indicating that the order failed, and encodes any comments and acceptability violations generated by capture plug-in 38 or order capture controller 22 into an order acceptance response to the client computer, using standard error codes. If the transaction is authorized by the payment processor, order capture controller 22 may mark the transaction as being captured, call out to a capture notification module 58, and notify the client computer in an order acceptance response. Alternatively, if the transaction is authorized by the payment processor, order capture controller 22 may call out to a custom capture plug-in 40 supplied by the operator of the software that can perform additional checking over what the payment processor does, to provide a higher level of security. If custom capture plug-in 40 rejects the transaction, order capture controller 22 marks the transaction as being failed, calls out to the failure notification module 56, and notifies the client computer as described above. If custom capture plug-in 40 accepts the transaction, order capture controller 22 places the order in a capture state, calls out to the capture notification module 58, and notifies the client computer.

Each of sub-transactions 80, 82, and 84, at the end of its processing, either "commits" if processing has proceeded successfully, which terminates the processing of the sub-transaction, or "rolls back" if there has been some sort of problem with the processing, in which case the sub-transaction attempts to begin its processing again. This architecture minimizes the potential of locking of databases that are accessed by order capture controller 22, because only a portion of the overall processing of order capture controller 22 actually repeats itself in the event of a problem.

Failure notification and capture notification is useful because, for example, there are two ways to do inventory reservation. One method is to reserve inventory during the order acceptance process and to subject it to a time window. Then when the client computer requests an order capture during the time window, the capture notification module 58 notifies the reservation system that the time window is no longer applicable and the product is really going to be purchased. Another method is to perform a tentative reservation during the order acceptance process or at the top of the capture order process and then if the order is not captured the failure notification module 56 can notify the reservation system that the reservation should be cancelled.

Capture notification plug-in 58 is advantageous in that, for example, the plug-in can be supplied by a seller of newspaper subscriptions and may update a subscription table 43 that lists periodicals to which a person has access. A subscription table 43 keeps track of the newspapers and periodicals to which a particular person has access and keeps track of when the access expires. Newspapers and periodicals can use the subscription table 43 to control access to subscription content, by inquiring whether a particular person has a subscription that has not expired. If the subscription table 43 indicates yes then the newspaper or periodical will grant access, but if the answer is no then the newspaper or periodical can inform the person that access has been denied and inquire whether the person wishes to subscribe.

Micro-transaction purchases can be handled by order capture controller 22 using such a subscription table 43. If a client wishes to initiate a subscription to a certain periodical or newspaper at a charge of a certain price per page or article, for example, the client can cause a fixed amount to be paid, and every time the web page of the periodical or newspaper is visited an account will be decremented by the price per page or article. The initial payment can be handled by order acceptance controller 20 and order capture controller 22, and then a capture notification plug-in 58 increase the number of tokens in a token database 41 that are available for use in exchange for reading of each page or article. When the web page of the periodical or newspaper is visited by the party from whom the fixed amount was paid, the number of tokens in the token database 41 is decremented. In this manner the electronic commerce system can provide a cheaper result for an individual who is interested in only a small portion of a periodical or newspaper, as opposed to paying a blanket amount for the right to read the entire periodical or newspaper.

After the authorization has been completed, a final call-out is performed to a custom post-capture plug-in 42 supplied by the operator of the software that can cause functions such as sending of e-mail or any other activity that should be performed only after the transaction has been captured. Because post-capture plug-in 42 operates after sub-transaction 84 has been completed, it is useful for performing functions that consume large amounts of time, without affecting the capture process.

One implementation of the digital coupons discussed above involves gift certificates. The use of gift certificates involves selling the gift certificate and redeeming the gift certificate. In the selling phase, a merchant client computer creates an order acceptance request that includes extension information indicating that the order is a gift certificate for the item requested by the client computer. The order acceptance request is processed in the ordinary manner described above, and when the order acceptance request is captured, a post-capture plug-in of order capture controller 22 creates a serial number for the gift certificate and places it in a database along with its price and sends the client computer the gift certificate, which is a digital coupon that includes the serial number. The purchaser of the gift certificate can then transmit it to a recipient.

In the redemption phase, the recipient can click on an icon of the gift certificate and the recipient will receive a web page of a merchant that sells the product. The recipient receives an order form and initiates an order acceptance request. Plug-in 32 processes the gift certificate as part of the coupon checking step in the manner described above and ensures that the serial number of the coupon has been used only once by checking the database in which the serial number is stored.

Figure 4:
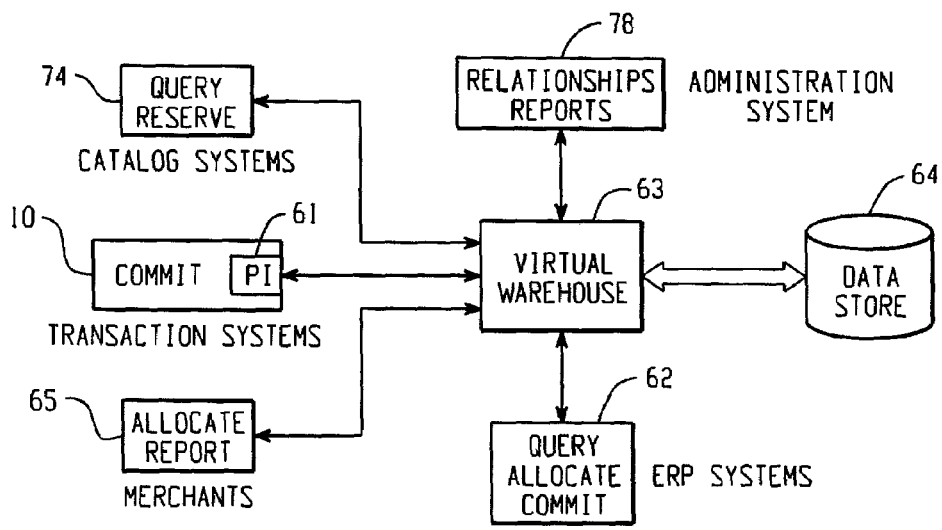
FIG. 4 is a block diagram of an inventory availability controller system for use in the electronic commerce system of FIG. 1.

With reference to FIG. 4, another implementation of the electronic commerce system involves a virtual warehouse system. According to this concept, a merchant 65 can contact a virtual warehouse server 63 through an internet browser and can store a virtual inventory of items for storage in a database 64 that is accessed by item check plug-in 61 (an example of an inventory control plug-in 30 in FIG. 2) through a call to virtual warehouse server 63. Merchant 65 might, for example, provide this information every morning after examining the supply of various items in the merchant's store. The merchant would reserve a fraction of the actual supply of each item for sale within the merchant's physical store and allocate the remaining fraction to the virtual warehouse by storing the inventory of that remaining fraction in database 64. Then, when plug-in 61 performs inventory control, plug-in 61 checks database 64 to ensure that the item or items requested by the client are included in the merchant's virtual inventory, and plug-in 61 modifies the inventory accordingly.

According to the concept of a virtual warehouse, a small or medium enterprise places a portion of its inventory under the management of the virtual warehouse, which can then make commitments to customers against that allocation. For example, a small seller of widgets may create a Web-based catalog. Since the market for widgets depends on immediate gratification of buyers, it is important to assure availability. Each business day, the seller uses an administrative Web application to grant control of a certain number of widgets to the virtual warehouse. When a buyer browses the widget catalog, the catalog system uses a real-time query to the virtual warehouse to obtain the number of widgets on hand. The catalog uses the quantity obtained to control its behavior, selecting regular or promotional pricing. When a buyer selects a widget for purchase, the catalog system obtains a reservation against inventory from the virtual warehouse. The reservation is good for a fixed time such as thirty minutes. The idea is similar to the way airline reservations work. The reservation is good for a fixed time, and lapses if the tickets are not paid for before the reservation expires. When the transaction commits before the reservation expires, the Internet commerce transaction system records that fact with the virtual warehouse, confirming the reservation and removing the appropriate widget count from the allocation. During the day, or periodically, the seller can add or remove inventory from the virtual warehouse, although inventory cannot be removed if held by an active reservation.

In this way, a small enterprise can obtain the benefits of a fully integrated inventory management system without great expense. The virtual warehouse is merely a debit, credit, and reservation system for paper inventory, but the customer is happy because the customer can obtain a guarantee of delivery.

The virtual warehouse breaks down only at the margins: if not all inventory is entered in the virtual warehouse, then some customers may not be able to order when in fact supply is available. However, a customer is never promised delivery when inventory is not available.

The virtual warehouse 63 is built around a database 64 that stores items, inventory, and reservations. Around that database are the applications that interact with it on behalf of catalog systems 74, transaction systems 10 (such as the electronic commerce systems described herein), merchants 65, ERP systems 62, and administrators 78.

Figure 5:
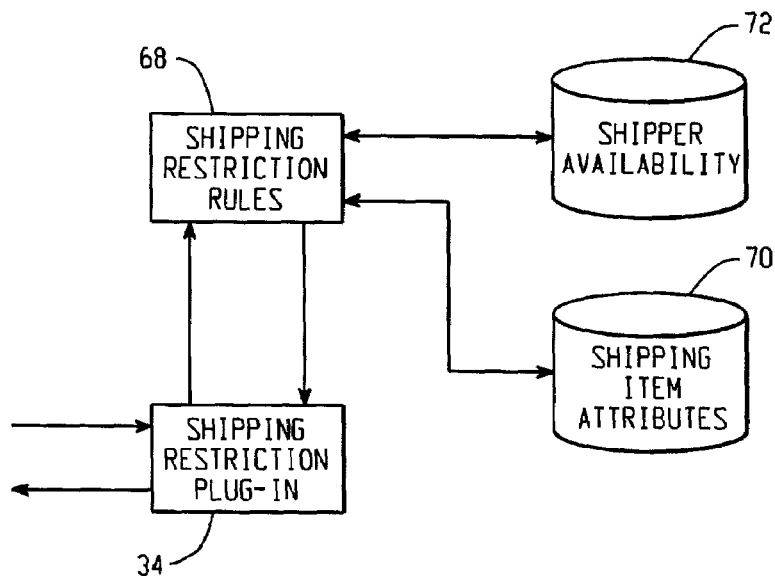
FIG. 5 is a block diagram of a shipping restriction plug-in system for use in the electronic commerce system of FIG. 1.

With reference to FIG. 5, one implementation of another restriction plug-in 34 is a shipping restriction handler. For certain types of orders, the shipping choices may be limited by the details of the order. For example, an order containing certain types of hazardous materials may have a limited number of shipping choices. An order specifying a Saturday delivery to a remote location may have no shipping choices available.

During the negotiation phase, an order acceptance request is routed to shipping restriction plug-in 34, which passes the order acceptance request to shipping restriction rules calculator 68, which figures out which shipping choices are valid for the order. The rules may use a shipping item attributes database 70 that specifies certain shipping-related properties for items in the order. For example, shipping item attributes database 70 would specify that nitric acid is in a certain hazardous materials class. Alternatively, the shipping item attributes could be contained in the order or item descriptions and need not be looked up in database 70.

Shipper availability database 72 specifies which shippers are available for certain types of orders. For example, it would specify that a particular courier ships to a particular remote region on Monday through Friday, for non-hazardous materials only. Based on this availability, shipping restriction rules calculator 68 would not offer that particular courier as a shipping option for an order specifying Saturday delivery in that region, or for any order containing hazardous materials shipped to that region, or for both.

Once shipping restriction rules calculator 68 has determined the list of available shippers for the order, that list as well as optional shipping choice meta-data is returned to shipping restriction plug-in 34 for incorporation into the order acceptance response. The list of available shippers may be empty, which means to the client that the order is not shippable. The list of available shippers may be one, which means that the client does not have a choice. Or, the list of available shippers may be more than one, which means that the client may choose from any of the offered shipping choices. In all cases, the optional shipping choice meta-data provides descriptive text for the buyer about why the shipping choices may be restricted.

There have been described novel and improved electronic commerce systems. It will be apparent to persons skilled in the art that numerous modifications of and departures from the specific embodiments described herein are possible without departing from the scope of the invention as defined in the claims.

The following description contains excerpts from a manual describing one implementation of the electronic commerce system outlined above.

Transact Architecture

Why Redesign the Architecture?
Transact 4 is conceived as the Transact release that:
Provides a product with a complete set of features
Exposes many internal layers to customization
Allows customers to write applications
Transact 4 sets the standard that all similar Internet commerce products must meet because of this unique combination of inside-out exposure through the rich feature set and outside-in access through customization and the APIs. There are other commerce products that claim to provide similar ability to customize or extend features. The other products suffer in comparison to Transact 4 because they provide shell APIs with no built-in functionality. It is as though the programmers wrote an operating system API without implementing file systems, memory management, and other expected features of an operating system. Instead, the product designers expect the software owner to provide these features. Transact 4 achieves the difficult task of providing a fully functional Internet commerce operating system with all the hooks necessary to extend or replace core components.

Many owners will be satisfied using Transact as it is after installation, without any further customization than editing the screens with their favorite HTML editing tool. Sellers and their employees, especially, will appreciate the Commerce Center that gives them access to store registration and management. Access to core business logic in the product through APIs allows customers to write modules to extend product functionality without requiring recompilation, relinkage, or reinstallation of the product.

Examples of customization in Transact 4 are:
Sellers and administrators can customize large portions of the user interface.
Sellers and administrators can localize the product to the language of their choice, including those with multibyte character encoding.
Sellers have a wide variety of payment options they can choose from in Transact.
Core objects in the system can be tagged with extra or custom fields defined by the seller.
The fields are retained in the system and are retrievable via the user interface and the APIs.

Examples of APIs available for customer applications are:
The Buyer Profile API, designed for customers who wish to load the transaction database with existing customer information that they already have.
The Fulfillment API, which stores the purchase history and provides the mechanism necessary for writing custom fulfillment applications.
The Microtransactions API, which lets customers write their own prepay or postpay microtransaction applications with their own user interface. An owner can replace or extend any aspect of microtransaction functionality without affecting the core product.
The Order Entry API, which lets customers implement their own catalog or shopping cart applications that deposit orders into Transact, bypassing the Transact buyer user interface.

Examples of extensible and replaceable modules in Transact 4 are:
Payment modules—These modules are for enabling both payment brands, such as Visa, and payment agents, such as First USA Paymentech.
Order Entry modules—These modules plug in to the order capture subsystem of Transact 4 that performs activities like inventory checks or payment card fraud checks.
E-mail modules—Owners can replace the way Transact 4 sends e-mail to users, including the encryption method.
Fax modules—Owners can replace the way Transact 4 sends faxes.
Smart Pages modules—Owners who want to customize screens for each buyer can write a module to do this.
Tax modules—Owners can replace or extend the way Transact computes sales tax.

The Payment API is a public API. All the other APIs are leveraged with the help of Open Market consulting services.

Foundations

Transact 4 is a collection of objects, components that contain those objects, and applications that use the component and object APIs. There are no monolithic applications in Transact 4, instead, all Transact applications, such as all the buyer CGI scripts, are clients of component APIs. It is therefore easy to discuss scenarios where components may be replaced or extended without requiring changes to the basic applications.

Component Architecture

The component architecture of Transact 4 leverages the ideas and technology behind the Microsoft component object model (COM). COM describes a world where components define classes and classes implement interfaces. Interfaces are the common lingua franca; components and classes may be replaced, extended or revised without requiring client changes as long as they continue to implement the same set of interfaces.

The strength of COM is that it provides a mechanism for independently written software components to find each other through the registry, launch each other through dynamic linking, and a common language through their interfaces.

For example, someone wishing to write a new kind of payment instrument in Transact 4 does so by implementing a new component, assigning it a new class identifier, and ensuring that the component implements the appropriate payment authorization and settlement interfaces. The component is physically a shared library that can be dynamically linked into Transact applications. Transact 4 provides a registry where information is stored about the new component, such as its class ID, where it lives, and which interfaces it support. The next time a Transact application that needs available payment options is launched, it interrogates the registry to find the new component.

Transact 4 ships with some components, for example, e-mail and fax. Information about these components can be found in the registry as well. They are implemented as dynamically linked libraries with class identifiers and other necessary COM information. The effort required to replace or extend them is similar to the effort required to develop a new payment component.

Architectural Overview

Transact is an order capture and processing system that interacts with one or more payment modules that handle the payment for orders. In addition to handling orders, it provides features for sellers to manage their stores, an interface for buyers to complete and monitor purchases, and tools for an administrator to monitor Transact. All of the Transact subsystems operate with a common set of business objects:

Order object. This object represents a contract between the buyer and seller. The object captures all information relevant to the order, including the items being ordered, the terms and conditions, the payment information, and the fulfillment information. The moment of capture occurs when the buyer clicks a "buy" button; until that moment the order information is stored in a shopping cart.

Invoice object. This object represents a fulfillment event, where goods or services are delivered, fully or partially, to the buyer. Any subset of goods or services in an order can be shipped, canceled, returned, or charged back. One invoice object represents one action to one or more items in an order object.

Principal object. A principal is an entity that can be authenticated. This object identifies the software component or person contacting Transact, so Transact can ascertain who the entity is and what it is allowed to do.

Payment instruction. The pmt Instruction object captures information concerning the mechanism for funds transfer between buyer and seller, such as a payment brand, authorization, or a payment agent.

Figure 6:
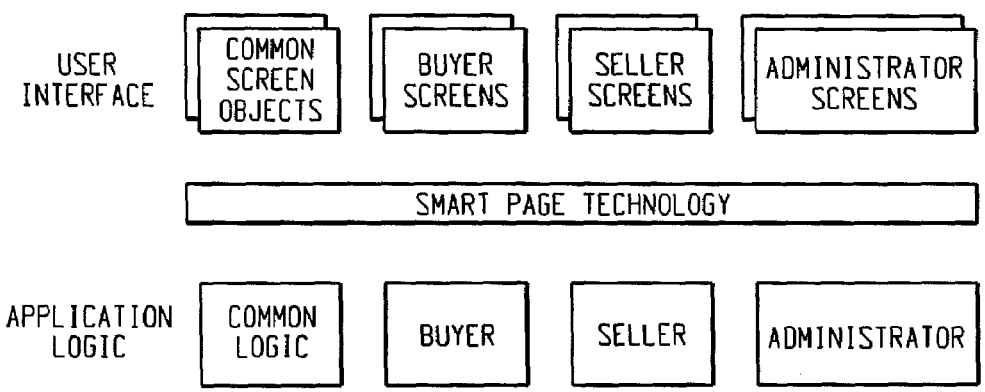
FIGS. 6-12 are block diagrams of an implementation of the electronic commerce system described herein.

The user interface and application logic, illustrated in FIG. 6, are interfaces to users. There is a library of common user interface screen components, for example, the order form or the name address block, that are shared among subsystems.

There are three groups of applications:

Buyer applications. This group implements all buyer activities, including order capture, order status, payment account establishment, payment account updates, Smart Statements, and so on.

Seller applications. This group implements all online business activities, such as managing the store, presenting statements, processing orders, and generating reports.

Administrator tools. This group implements Transact administrator activities, such as configuration, key management, and maintenance.

The user interfaces for these applications depends on a common set of libraries:

Smart Pages. This library provides a common set of HTML screen components, such as a name address block for rendering addresses. These are the screen components that provide a template mechanism for rendering HTML screens.

HTML/HTTP common services. These libraries provide a common set of server-side HTTP protocol and HTML services for handling requests, parsing query strings and form POST data, handling URLs, and so on.

Figure 7:
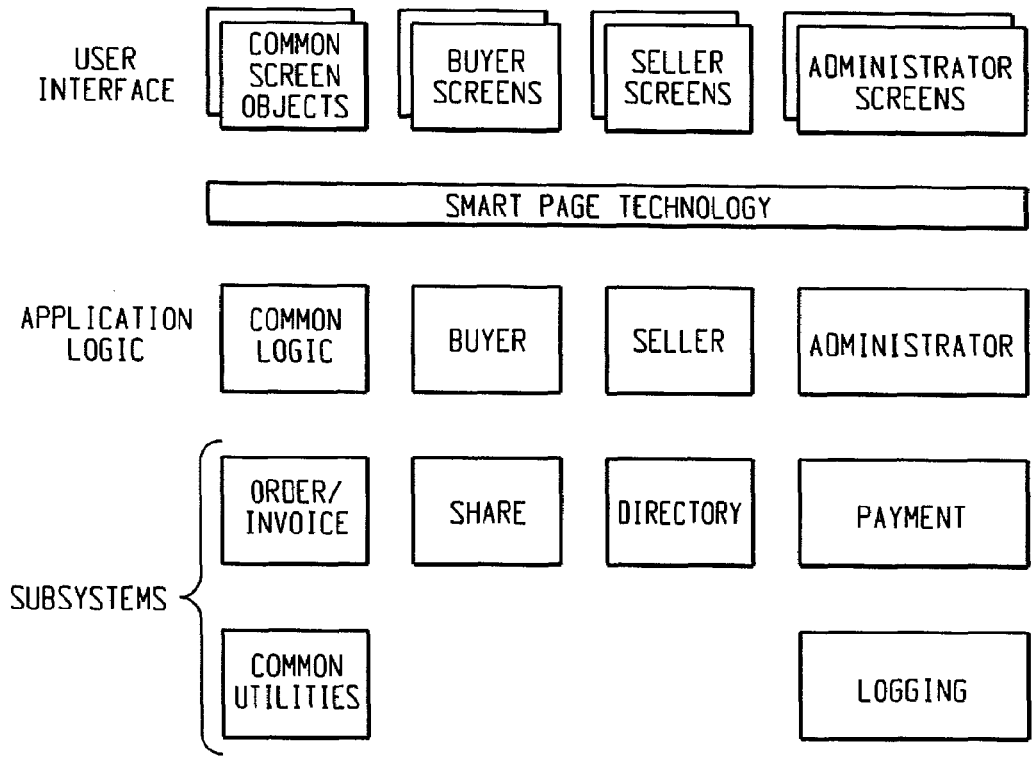

The core subsystems, illustrated in FIG. 7, provide the base functionality on which the buyer, seller, and administrator applications are built. The core subsystems implement the functionality behind the Transact APIs.

They include:

Order-invoice subsystem. This subsystem provides services that accept and validate new orders, as well as update and report on the current state of orders and invoices in the system.

Store subsystem. This subsystem maintains the status of the business and provides a set of seller services related to order processing, including tax and shipping calculations.

Directory subsystem. This subsystem maintains a database of all Transact users, known as principals, and of all addresses when principals have addresses. For example, a buyer is a principal with associated addresses. A fulfillment module is a "user" of the system, but it has no address. This subsystem also provides a set of services for adding, deleting, retrieving, and authenticating users.

Payment subsystem. This subsystem provides payment services, such as authorization and settlement. The payment subsystem hides most of the details of particular payment instruments, so new instruments can be added here with minimal or no changes to other subsystems.

Logging subsystem. This subsystem provides a central event logging facility for all other subsystems.

All subsystems depend on a set of common utility libraries for string handling, message catalogs, hash functions, and so on. All subsystems gather configuration information from a common facility called registry.asc.

Core Business Objects

This section details the core objects that are sued by nearly all subsystems.

The business objects mentioned at the beginning of this chapter are just portable data structures that represent the contents of business documents such as orders, invoices, and receipts. They are not backed by a database, though they are certainly stored in databases, and can be carried anywhere a byte stream can be handled, for example, MIME attachments in e-mail, HTTP, flat files, and so on. Examples of these objects are the order, orderItem, invoice, invoiceItem, and address objects.

Transact subsystems provide service objects. Service objects accept, process, and find business objects such as orders, invoices, payments, and addresses. Each of the business objects implements the following methods:

Mutators. These methods are used to change or set object state. The methods may perform basic error checking such as string length checking, or they may prevent updates for objects in a read-only state.

Accessors. These methods read or get object states.

Serialization and deserialization. These methods write and read the object contents to a byte stream. The stream is portable; objects serialized on one platform are readable on all other platforms. The stream is reasonably compact, as the objects have to be passed over slow dial-up links, for example, for the order capture subsystem. The stream may contain various consistency checks, such as a unique type identifier and a checksum. The stream representation has a version number, so that objects can be revised, yet be backwards compatible to old streams.

The serialization and deserialization methods are inspired by the Microsoft structured storage for persistent COM objects, though our approach is restricted to simple byte streams.

The service and business objects do not have any user interface components. The presentation of the data contained within the objects is handled by Smart Pages.

All strings in all objects support the Unicode standard for encoding characters. For places where strings show up in external interfaces, the UTF-8 variable length encoding, which is backward compatible with 7-bit ASCII, is preferred.

Order and OrderItem Objects

Figure 8:
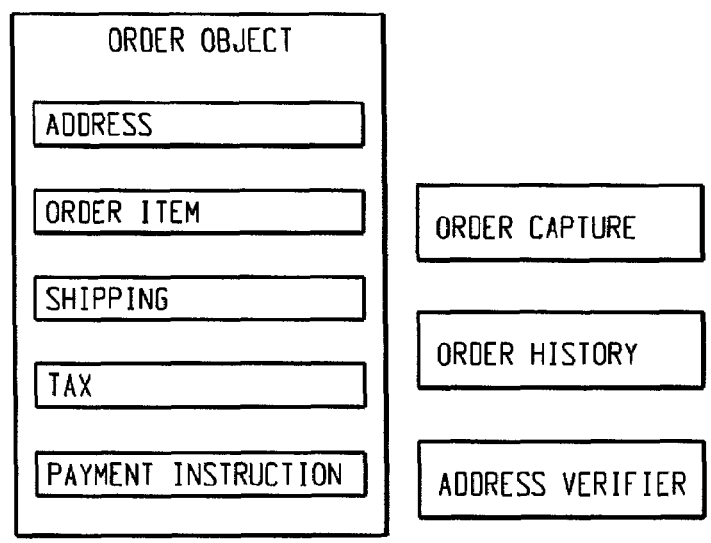

An order object, illustrated in FIG. 8, represents the contract between buyer and seller for the items ordered and the terms and conditions of the sale. An orderItem object represents a line item in an order. The order object contains zero or more orderItem objects.

Open Market made some simplifying design assumptions for the order object:

Each order has a single billing address and a single shipping address. If you want to ship different items to different addresses, create multiple orders per destination address.

Each order is for items from a single store or business. If a buyer wants to buy items from multiple stores, then he or she creates multiple orders.

Note: The above assumptions about the objects do not prevent us from implementing a multiple-address, multiple-store user interface for buyers.

Current order status is maintained by the order-invoice subsystem. That subsystem provides services for looking up existing orders, adding new orders, and changing order status.

Invoice and InvoiceItem Objects

Figure 9:
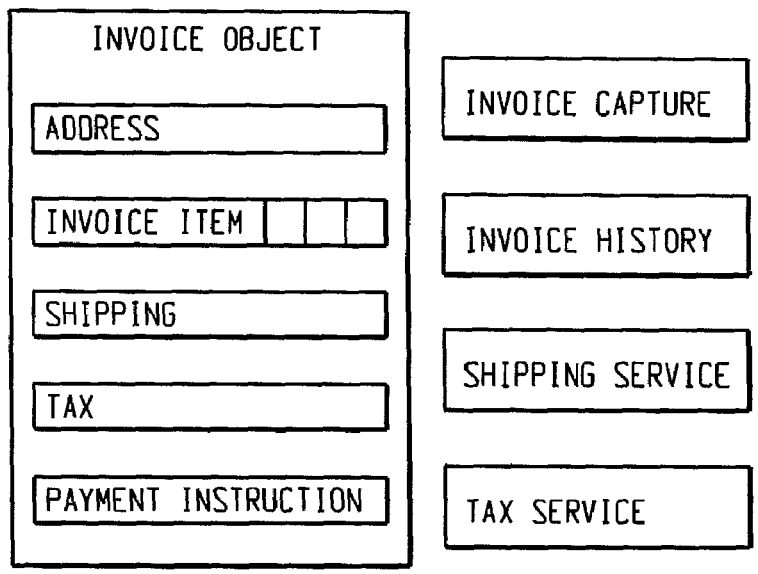

An invoice object, illustrated in FIG. 9, is a record of fulfillment that is created every time a shipment or cancellation occurs.

An invoiceItem is one of the items in the invoice that was shipped or canceled. We make the simplifying assumption that every invoice refers to only one order. An order can have multiple invoices associated with it, one for each fulfillment activity related to the order. An invoice has a single billing and shipping address. An invoice also has a single pmtInstruction object associated with it.

Payment Instruction Object

Figure 10:
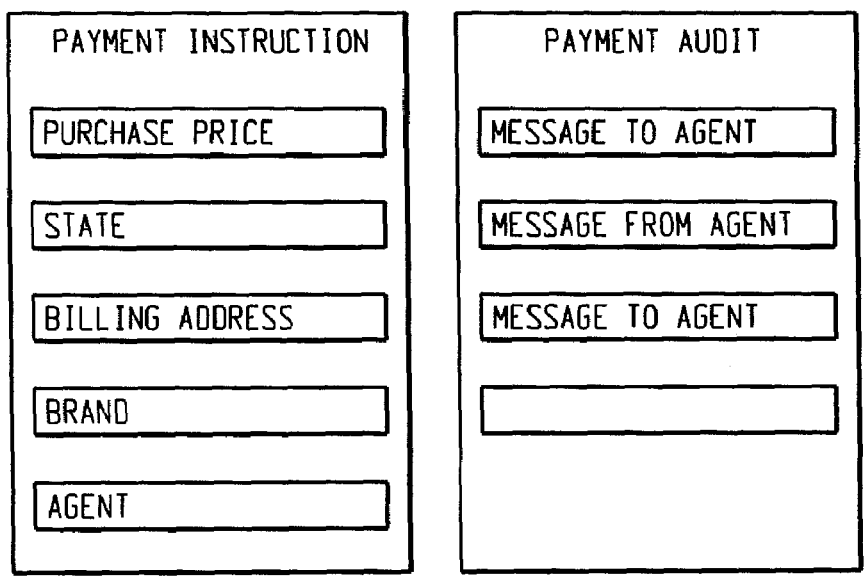

A pmtInstruction object, illustrated in FIG. 10, is created when the user submits an order form. It encapsulates the payment contact between the buyer and seller, the payment obligation of the buyer, the payment instrument that the buyer wants to use and the seller agrees to accept, as well as the state of funds transfer between the buyer and seller.

A Transact payment agent module uses methods to accomplish a payment authorization and funds transfer. The payment object carries the payment brand identifier of the payment module.

Address Object

Figure 11:
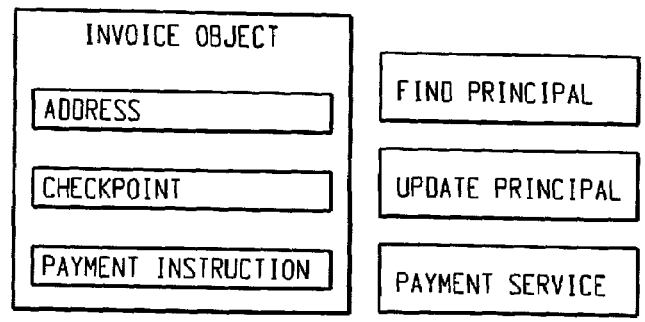

The address object, illustrated in FIG. 11, is used to hold postal address, e-mail address, and other contact information. The address object is contained within other objects, such as the order and invoice objects.

Applications

This section provides further information about the Transact application software. It is divided according to user class, however, many applications are used by a combination of user classes with different information available to different classes.

Buyer Applications

The buyer applications group together user interface, API, and functional logic for buyer tasks into CGI scripts. Four of the major applications are described below. Other buyer applications include:

payinfo.cgi—allows buyers to register payment cards
subsummary.cgi—view of subscription history
microbuy.cgi—features for making microtransactions
microbal.cgi—view of current prepay balance for microtransactions Order Form Application The order-form.cgi script provides the user interface and application logic for composing and capturing orders from the buyer. The output of the order capture process is a complete order, which is handed off to the order-invoice subsystem for processing. This module provides an API that supports the implementation of ActiveX and Java user interfaces for order capture. It can also support the implementation of remote user interfaces, where the interface runs on the content server, but uses order capture services provided by Transact.

This module implements an HTML user interface on top of the Order Entry API. This user interface implements an HTML version of everything needed to capture an order: processing incoming digital offers (DOs), maintaining shopping carts, and collecting payment information. This user interface is commonly referred to as the buyer flow, and represents most of the functionality in the payment.cgi script that was in Transact 3.0.

Modularizing order capture generates implementation flexibility. In the future, it allows for specialized order capture modules for particular applications. These variants can run simultaneously on a single Transact server, each sharing the common core for order processing and service. Example modules include a:

Specialized retail module
Business-to-business module
Buyer work flow order approval module
Support for negotiated prices module
Statements and Receipts Application The smart-statement.cgi and smart-receipt.cgi applications provides a user interface and application logic for servicing the buyer's order after it has been captured. Order service tasks include:

Displaying the Smart Statement
Processing order and invoice status
Handling payment failures
Making returns and credits
User Information Module The user information module implements a user interface for buyers to perform registration maintenance tasks through userinfo.cgi, including:

Registering for the first time
Changing registration information
Seller Applications Seller applications implement the user interface and application logic for sellers to register and manage their stores. The Commerce Center is run by index.cgi. Sellers use smart-receipt.cgi and smart-statement.cgi to monitor and fulfill orders. The reconcile.cgi script is used by both buyers and merchants to review and solve payment card problems. There are four main groups of seller applications:

Store Registration Module

The applications store-registration.cgi, oaa_select_tax.cgi, oaa_vat_register, and transport.cgi let sellers create stores and specify various store parameters such as:

Store locale
Store currency
Acceptance of purchase orders or microtransactions
Store payment agent parameters
Shipping options
Tax options The transport.cgi script lets a seller designate a fulfillment party to perform shipping activities. This module allows for partial shipment and cancellations and makes extensive use of the Transact Fulfillment API.

Reporting Module

This module enables a variety of seller reports, including the ability to define new reports. Examples of reports are:

Customer listings
Orders placed at your store
Payment details and processor information for reconciliation purposes
Tax reporting on the amount of tax charged on an order or invoice.

Tax audit reports are still downloaded directly from the transaction database.

The supporting architecture for the reporting module is to extract a reporting database with a subset of information from the main database in the following way.

Transact run jobs that put "slices" of the seller's data in Microsoft access format onto the Transact file system in a specific directory. These extracted files are encrypted because payment card numbers might be in the data stored.

The remote client browses this directory to see which new files are present. The client then makes a secure request for the files with the Transact reporting client. The reporting module authenticates the seller, validates the request, decrypts the files, and opens the files to download the data.

Sellers retrieve the Access database and store it on their desktop. Reports can be generated on the data using any reporting tool that supports Access.

Microtransactions Module

The microtransactions subsystem separates fulfillment and settlement by allowing authenticated buyers to either prepay or postpay for access to digital goods.

It introduces the tab object, which keeps a tally of a buyer's charges and credits at one store. The microtransaction configuration object records settings for microtransactions for one store. The microtransactionItem object is analogous to an orderItem object, representing one purchase of one digital good.

In both the prepay and postpay case, the buyer chooses a digital good marked as a microtransaction. The microbuy.cgi script processes the offer by debiting the buyer's tab, then redirecting the buyer to the digital receipt, creating an effect of going directly to the information. For postpay accounts, there is an additional step, performed through the Microtransactions API, that aggregates the microtransaction purchases into an order. The order is then passed to the order-invoice subsystem for processing.

When a buyer establishes a prepay tab, the amount is authorized and settled before delivery of the goods occurs. When a buyer is approved off line for a postpay account, the buyer delivery occurs before payment is completed.

Taxes are calculated on the entire prepay amount before it is authorized, so taxes are included in the authorized amount. In the postpay case, taxes are applied to each digital good, then the total for that item is added to the tab.

A second script, microbal.cgi, allows buyers and merchants to review the buyer's tab.

Subscription Module

Sellers and buyers also use the scripts concerned with subscriptions, which allow for purchasing and accessing online content over an unlimited or a specified length of time. The subscriptions component takes the order from the order capture subsystem before the moment of capture. It analyzes the digital offers an enters data into the periodical, subscription, installment, and installment_plan database tables. Invoices, created by an ongoing job run by Transact, trigger payment at the appropriate intervals.

Subscription applications include:
  authorize.cgi—This application, used for many reasons within Transact, allows users access to Transact scripts and content. A buyer only needs to log in or register themselves once before viewing content.
  subscription.cgi—The subscription application verifies that the buyer has paid for a subscription. It then authorizes them to access content areas they have paid for.
  subsummary.cgi—Buyers can review subscriptions they have purchased.
  sub-manage.cgi—Sellers can manage prices or cancellations of subscriptions.
  sub-acl.cgi—Sellers use this application to mange access control lists (ACL) to subscriptions.

Administrator Applications

Administrator tools provide the user interface, external interfaces, and application logic for Transact administrators to run their system. There are three modules.

Installation Module

This module is structured so that all queries of the installer are made before the actual install. The install module decompresses all the servers through untar and places them appropriately on the host machines.

Upgrade Module

After an installation is complete, the upgrade module can be invoked to copy all relevant data from an existing Transact 3.0 system to the new installation. This data includes:
  The transaction database
  Payment processor information
  Relevant Transact and satellite server configuration information
  Web server configuration information, including the migration from Open Market Secure WebServer to Netscape Enterprise Server Administration Module The third module is the forms-based administration screens and functionality. This module has not been extensively upgraded for Transact 4. Relevant applications include:
  index.cgi—Presents the main FBA screen.
  configure-agents.cgi—Controls configuration of payment agents.
  acct-validate.cgi—This critical installation step is used to configure the payment processor that is used for address verifications (AVS).
  payment-errors.cgi—Lists errors in payment card transactions.
  logmessage.cgi—Displays log messages in HTML format.
  info-deliver.cgi—Presents the administrator tools menu.

Application Program Interfaces (APIs)

Figure 12:
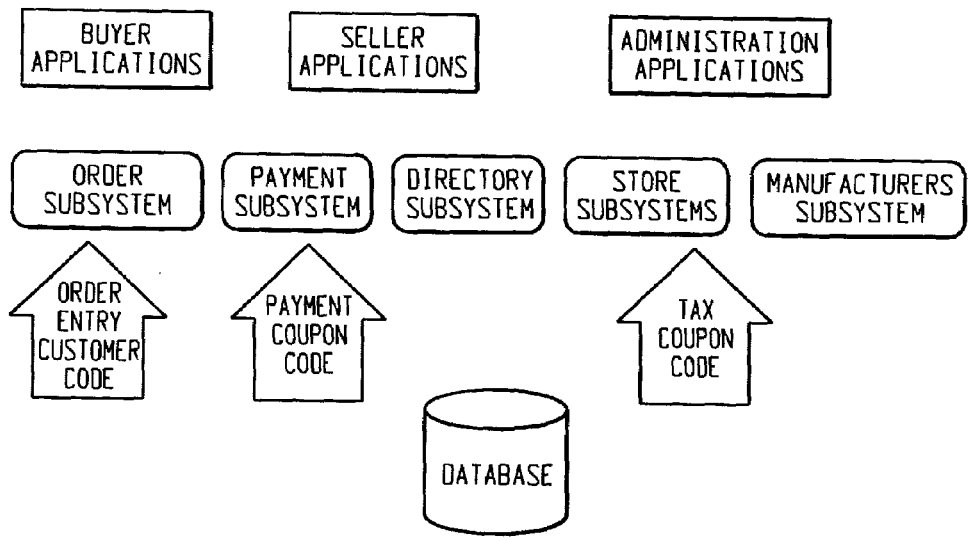

The objects, applications, and subsystems are connected through the use of APIs as shown in FIG. 12. Note that some of the APIs in the scheme below are internal: internal Payment, user service, and store service. Subscription authentication, settlement, and fax advice of orders are conducted with the help of HTTP. Descriptions of the APIs from a designer's perspective can be found in "APIs" on page 69.

Buyer Profile API

The Buyer Profile API, formerly called the customer database API, which enables bulk loading of buyer information from an external database to the Transact database. This API is not enhanced in Transact 4.

Fulfillment API

The Fulfillment API has two major purposes:
  Order and invoice query
  Invoice creation and entry into the database
  Order and invoice query are used by applications that wish to query the status of orders that match specific criteria such as:
  Order number
  Range of order numbers
  Date range
  Buyer name or address
  Invoices for retrieved orders can be queried as well.

Transact buyer and seller applications make extensive use of the order and invoice query mechanisms in the Fulfillment API.

Invoice creation and entry are used by applications that wish to augment the shipping module, either by presenting bulk shipping functionality, or by custom shipping user interfaces. An invoice is created for every shipping or cancellation activity, partial or full. An associated payment instruction object is created and funds transfer initiated, if Transact is expected to do settlement. The invoice is then entered into the transaction database.

Order Entry API

This API is the heart of the order capture subsystem; it is an API that separates the order capture function from the user interface. It also has the important property that it can work securely with nonsecure clients, that is, it doesn't depend on any client to do the final calculations.

The API uses an offer-counter-offer style. Clients create order objects representing proposed orders, then the subsystem gets the order proposals, verifies them, and creates another order object representing the counter-offer, which also includes calculated values for tax, shipping, and discounts. The counter-offer order may include a set of restrictions from which the buyer has to select, such as a limited number of shippers, before the seller accepts the final order.

The order entry API invokes the underlying services of stores, authentication, and payment as necessary to verify the order contents, calculate various derived values, and accept a valid order for injection. Once a valid order is captured, it is handed off to the order injector for processing by the rest of the system.

Payment API

The Payment API has two parts, one that works internally with Transact, and one that allows system integrators or Open Market consulting to add new payment modules.

Transact Internal Payment API

There is a large and complex part of payment internal to Transact. The internal Payment API is a collection of APIs to encapsulate those portions of Transact that know about the details of payment.

This internal API makes it possible to create a payment instruction object and move it through the states of authorization and funds transfer. The information provides includes:

Information about the buyer payment instrument

Brand issuing the instrument

Authentication method for the payment instrument

Payment agent and acquirer

Amount and currency of funds transfer

External Payment API

Open Market offers only a fraction of all the payment options possible with Transact. The external Payment API provides a set of modules that allow new forms of payment to be added to Transact without changes to the rest of the Transact installation. Transact payment modules may implement one or both of the following objects:

Payment brand. An entity that issues payment instruments and backs them, for example, Visa. A module that implements a particular payment brand may elect to use an existing payment agent for authorization and settlement. For example, a new Winnie-the-Pooh brand credit card may elect to use a First USA Paymentech payment agent, because First USA can support the new card.

Payment agent. An entity that can manage funds transfer between the buyer payment instrument and the seller, e.g., payment processors, a SET payment gateway, a Mondex value acquirer, or a billing system.

The module implements the authorization and settlement methods. Replaceable payment agents allow for a variety of payment mechanisms, each of which supports a radically different paradigm for authorization and settlement.

Security on the Internet is a concern for many buyers and sellers. As a Transact owner, it is part of your role to reassure sellers and buyers about the relative safety of the Internet and the specific ways in which Transact protects them. The power of the World Wide Web and the Internet on which it rests does depend on its common protocol and open architecture, but that doesn't mean that Transact cannot protect the transmissions and data necessary to conduct business. This chapter looks at areas where security is a concern and the way Transact responds. Open Market has put a great deal of effort into successfully securing Web transactions, so that consumers and businesses can feel confident that abuses are averted.

It's also important to encourage businesses and consumers worried about security issues on the Internet to make a realistic assessment of the risks. For example, most visitors to a shopping mall don't think twice about giving their payment card to a waiter or sales clerk, even though the number is being registered in a system that could be unsafe, or that a copy of the charge receipt could end up blowing out of the dumpster behind the building. There is a misperception that it is easier to steal profitable information on the Internet than it is during physical business transactions, which is not true.

What is claimed is:

1. An electronic commerce system comprising:

a client computer; and a server computer;

the client computer and the server computer being interconnected by a public packet switched communications network;

the client computer being programmed to transmit to the server computer an order acceptance request comprising a plurality of terms or conditions of a proposed offer for a purchase, the order acceptance request comprising a discrete message that includes a plurality of modular elements whose individual integrity is protected by embedding cryptographic security codes within each of the modular elements, at least one of the modular elements individually protected by a cryptographic security code being a digital coupon;

the server computer being programmed to process the order acceptance request based on pre-programmed criteria, including authentication of the cryptographic security codes embedded within each of the modular elements and examination of the modular elements of the discrete message individually protected by the cryptographic security codes, and, based on the processing of the order acceptance request, to transmit to the client computer an order acceptance response based on the pre-programmed criteria, the order acceptance response comprising a discrete message transmitted during a negotiation phase of a transaction that includes a plurality of modular elements whose individual integrity is protected by embedding cryptographic security codes within each of the modular elements;

wherein the client computer is programmed to receive the digital coupon, protected by a cryptographic security code, from another computer.

2. An electronic commerce system comprising:

a client computer; and a server computer;

the client computer and the server computer being interconnected by a public packet switched communications network;

the client computer being programmed to transmit to the server computer an order acceptance request comprising a plurality of terms or conditions of a proposed offer for a purchase, the order acceptance request comprising a discrete message that includes a plurality of modular elements whose individual integrity is protected by embedding cryptographic security codes within each of the modular elements, at least one of the modular elements individually protected by a cryptographic security code being a digital coupon;

the server computer being programmed to process the order acceptance request based on pre-programmed criteria, including authentication of the cryptographic security codes embedded within each of the modular elements and examination of the modular elements of the discrete message individually protected by the cryptographic security codes, and, based on the processing of the order acceptance request, to transmit to the client computer an order acceptance response based on the pre-programmed criteria, the order acceptance response comprising a discrete message transmitted during a negotiation phase of a transaction that includes a plurality of modular elements whose individual integrity is protected by embedding cryptographic security codes within each of the modular elements;

wherein the digital coupon is configured to be used by any coupon holder that possesses the digital coupon, and wherein the server computer is programmed to accept the digital coupon without regard to the identity of the coupon holder.

3. The electronic commerce system of claim 2 wherein the digital coupon contains a serial number to ensure that the digital coupon is used only once and the server computer is programmed to determine whether the digital coupon has been used previously and to accept the digital coupon only if it has not been used previously.

4. The electronic commerce system of claim 2 wherein the server computer is programmed to set at least one term of the order acceptance response based on whether the digital coupon is present in the order acceptance request.

5. The electronic commerce system of claim 4 wherein the at least one term of the order acceptance response is a price.

6. The electronic commerce system of claim 2 wherein the server computer is programmed to set at least one term of the order acceptance response based on whether the digital coupon in the order acceptance request is a particular type of digital coupon.

7. The electronic commerce system of claim 2 wherein the digital coupon is a gift certificate.

8. The electronic commerce system of claim 7 wherein the gift certificate comprises a serial number.

9. The electronic commerce system of claim 8 wherein the server computer is programmed to ensure that the serial number has been used only once by checking a database in which the serial number is stored.

10. The electronic commerce system of claim 7 wherein the client computer is programmed to display an icon of the gift certificate and to initiate the order acceptance request after a recipient of the gift certificate clicks on the icon.

11. The electronic commerce system of claim 10 further comprising a merchant computer, the merchant computer being programmed to respond to the recipient clicking on the icon by transmitting an order form to the client computer, the client computer being programmed to initiate the order acceptance request when the recipient fills in the order form.

12. The electronic commerce system of claim 7 wherein the client computer is a first client computer programmed to receive the gift certificate from a second client computer.

13. The electronic commerce system of claim 12 wherein the server computer is programmed to transmit the gift certificate to the second client computer, which in turn is programmed to forward the gift certificate to the first client computer.

14. The electronic commerce system of claim 13 wherein the gift certificate comprises a serial number and the server computer is programmed to create the serial number of the gift certificate before transmitting the gift certificate to the second client computer.

15. The electronic commerce system of claim 14 wherein the server computer is programmed to store the serial number in a database before transmitting the gift certificate to the second client computer, and is programmed, when it receives the gift certificate from the first client computer to ensure that the serial number has been used only once by checking the database in which the serial number is stored.

16. The electronic commerce system of claim 13 further comprising a merchant computer programmed to transmit the gift certificate to the server computer before the server computer transmits the gift certificate to the second client computer.

17. The electronic commerce system of claim 16 wherein the merchant computer is programmed to transmit the gift certificate to the server computer in the form of an order acceptance request that includes extension information indicating that the order acceptance request is a gift certificate.

18. An electronic commerce system comprising:
a client computer; and
a server computer;
the client computer and the server computer being interconnected by a public packet switched communications network;
the client computer being programmed to transmit to the server computer an order acceptance request comprising a plurality of terms or conditions of a proposed offer for a purchase, the order acceptance request comprising a discrete message that includes a plurality of modular elements whose individual integrity is protected by embedding cryptographic security codes within each of the modular elements, at least one of the modular elements individually protected by a cryptographic security code being a digital coupon;
the server computer being programmed to process the order acceptance request based on pre-programmed criteria, including authentication of the cryptographic security codes embedded within each of the modular elements and examination of the modular elements of the discrete message individually protected by the cryptographic security codes, and, based on the processing of the order acceptance request, to transmit to the client computer an order acceptance response based on the pre-programmed criteria, the order acceptance response comprising a discrete message transmitted during a negotiation phase of a transaction that includes a plurality of modular elements whose individual integrity is protected by embedding cryptographic security codes within each of the modular elements;
wherein the server computer is programmed to determine whether a coupon holder is authorized to use the digital coupon and to accept the digital coupon only if the coupon holder is authorized to use the digital coupon.

19. The electronic commerce system of claim 18 wherein the client computer is programmed to provide information to the server computer concerning identify of the coupon holder.

20. The electronic commerce system of claim 19 wherein the server computer is programmed to authenticate authority of the client computer by virtue of a two-way-authenticated SSL connection.

21. The electronic commerce system of claim 19 wherein the server computer is programmed to authenticate authority of the client computer using a basic authentication method.

22. The electronic commerce system of claim 19 wherein the server computer is programmed to authenticate authority of the client computer using a client certificate.

23. An electronic commerce system comprising:
a client computer; and
a server computer;
the client computer and the server computer being interconnected by a public packet switched communications network;
the client computer being programmed to transmit to the server computer an order acceptance request comprising a plurality of terms or conditions of a proposed offer for a purchase, the order acceptance request comprising a discrete message that includes a plurality of modular elements whose individual integrity is protected by embedding cryptographic security codes within each of the modular elements, at least one of the modular elements individually protected by a cryptographic security code being a digital coupon;
the server computer being programmed to process the order acceptance request based on pre-programmed criteria, including authentication of the cryptographic security codes embedded within each of the modular elements and examination of the modular elements of the discrete message individually protected by the cryptographic security codes, and, based on the processing of the order acceptance request, to transmit to the client computer an order acceptance response based on the pre-programmed criteria, the order acceptance response comprising a discrete message transmitted during a negotiation phase of a transaction that includes a plurality of modular elements whose individual integrity is protected by embedding cryptographic security codes within each of the modular elements;

wherein the cryptographic security codes are embedded within respective ones of the plurality of modular elements.

24. An electronic commerce system comprising:

a client computer; and a server computer;

the client computer and the server computer being interconnected by a public packet switched communications network;

the client computer being programmed to transmit to the server computer an order acceptance request comprising a plurality of terms or conditions of a proposed offer for a purchase, the order acceptance request comprising a discrete message that includes a plurality of modular elements whose individual integrity is protected by embedding cryptographic security codes within each of the modular elements, at least one of the modular elements individually protected by a cryptographic security code being a digital coupon;

the server computer being programmed to process the order acceptance request based on pre-programmed criteria, including authentication of the cryptographic security codes embedded within each of the modular elements and examination of the modular elements of the discrete message individually protected by the cryptographic security codes, and, based on the processing of the order acceptance request, to transmit to the client computer an order acceptance response based on the pre-programmed criteria, the order acceptance response comprising a discrete message transmitted during a negotiation phase of a transaction that includes a plurality of modular elements whose individual integrity is protected by embedding cryptographic security codes within each of the modular elements;

wherein the cryptographic security codes are digital signatures.

25. An electronic commerce system comprising:

a client computer; and a server computer;

the client computer and the server computer being interconnected by a public packet switched communications network;

the client computer being programmed to transmit to the server computer an order acceptance request comprising a plurality of terms or conditions of a proposed offer for a purchase, the order acceptance request comprising a discrete message that includes a plurality of modular elements whose individual integrity is protected by embedding cryptographic security codes within each of the modular elements, at least one of the modular elements individually protected by a cryptographic security code being a digital coupon;

the server computer being programmed to process the order acceptance request based on pre-programmed criteria, including authentication of the cryptographic security codes embedded within each of the modular elements and examination of the modular elements of the discrete message individually protected by the cryptographic security codes, and, based on the processing of the order acceptance request, to transmit to the client computer an order acceptance response based on the pre-programmed criteria, the order acceptance response comprising a discrete message transmitted during a negotiation phase of a transaction that includes a plurality of modular elements whose individual integrity is protected by embedding cryptographic security codes within each of the modular elements;

wherein the cryptographic security codes are message authentication codes.

26. A method of processing order acceptance requests in an electronic commerce system, comprising a client computer and a server computer interconnected by a public packet switched communications network, the method comprising:

receiving at the server computer an order acceptance request transmitted by the client computer comprising a plurality of terms or conditions of a proposed offer for a purchase, the order acceptance request comprising a discrete message that includes a plurality of modular elements whose individual integrity is protected by cryptographic security codes embedded within each of the modular elements, at least one of the modular elements individually protected by a cryptographic security code being a digital coupon;

processing the order acceptance request based on pre-programmed criteria, including authentication of the cryptographic security codes and examination of the modular elements of the discrete message individually protected by the cryptographic security codes; and based on the processing of the order acceptance request, transmitting to the client computer an order acceptance response based on the pre-programmed criteria, the order acceptance response comprising a discrete message transmitted during a negotiation phase of a transaction that includes a plurality of modular elements whose individual integrity is protected by cryptographic security codes embedded within each of the modular elements;

wherein the client computer receives the digital coupon, protected by a cryptographic security code, from another computer.

27. A method of processing order acceptance requests in an electronic commerce system, comprising a client computer and a server computer interconnected by a public packet switched communications network, the method comprising:

receiving at the server computer an order acceptance request transmitted by the client computer comprising a plurality of terms or conditions of a proposed offer for a purchase, the order acceptance request comprising a discrete message that includes a plurality of modular elements whose individual integrity is protected by cryptographic security codes embedded within each of the modular elements, at least one of the modular elements individually protected by a cryptographic security code being a digital coupon;

processing the order acceptance request based on pre-programmed criteria, including authentication of the cryptographic security codes and examination of the modular elements of the discrete message individually protected by the cryptographic security codes; and based on the processing of the order acceptance request, transmitting to the client computer an order acceptance response based on the pre-programmed criteria, the order acceptance response comprising a discrete message transmitted during a negotiation phase of a transaction that includes a plurality of modular elements whose individual integrity is protected by cryptographic security codes embedded within each of the modular elements;

wherein the digital coupon is configured to be used by any coupon holder that possesses the digital coupon, the method further comprising accepting the digital coupon at the server computer is programmed without regard to identity to the coupon holder.

28. The method of claim 27 wherein the digital coupon contains a serial number to ensure that the digital coupon is used only once, the method further comprising determining at the server computer whether the digital coupon has been used previously and accepting the digital coupon only if it has not been used previously.

29. The method of claim 27 further comprising setting, at the server computer, at least one term of the order acceptance response based on whether the digital coupon is present in the order acceptance request.

30. The method of claim 29 wherein the at least one term of the order acceptance response is a price.

31. The method of claim 27 further comprising setting, at the server computer, at least one term of the order acceptance response based on whether the digital coupon in the order acceptance request is a particular type of digital coupon.

32. The method of claim 27 wherein the digital coupon is a gift certificate.

33. The method of claim 32 wherein the gift certificate comprises a serial number.

34. The method of claim 33 further comprising ensuring that the serial number has been used only once by checking a database at the server computer in which the serial number is stored.

35. The method of claim 32 wherein the client computer displays an icon of the gift certificate and initiates the order acceptance request after a recipient of the gift certificate clicks on the icon.

36. The method of claim 35 wherein the electronic commerce system further comprises a merchant computer and wherein the merchant computer responds to the recipient clicking on the icon by transmitting an order form to the client computer, and wherein the client computer initiates the order acceptance request when the recipient fills in the order form.

37. The method of claim 32 wherein the client computer is a first client computer that receive the gift certificate from a second client computer in the electronic commerce system.

38. The method of claim 37 further comprising transmitting the gift certificate from the server computer to the second client computer, which in turn forwards the gift certificate to the first client computer.

39. The method of claim 38 wherein the gift certificate comprises a serial number and wherein the method further comprises creating the serial number of the gift certificate at the server computer before transmitting the gift certificate to the second client computer.

40. The method of claim 38 further comprising storing the serial number in a database at the server computer before transmitting the gift certificate to the second client computer, and when the server computer receives the gift certificate from the first client computer, ensuring that the serial number has been used only once by checking the database at the server computer in which the serial number is stored.

41. The method of claim 38 further wherein the electronic commerce system further comprises a merchant computer, the method further comprising receiving the gift certificate at the server computer from the merchant computer before transmitting the gift certificate from the server computer to the second client computer.

42. The method of claim 41 wherein the merchant computer transmits the gift certificate to the server computer in the form of an order acceptance request that includes extension information indicating that the order acceptance request is a gift certificate.

43. A method of processing order acceptance requests in an electronic commerce system, comprising a client computer and a server computer interconnected by a public packet switched communications network, the method comprising:
receiving at the server computer an order acceptance request transmitted by the client computer comprising a plurality of terms or conditions of a proposed offer for a purchase, the order acceptance request comprising a discrete message that includes a plurality of modular elements whose individual integrity is protected by cryptographic security codes embedded within each of the modular elements, at least one of the modular elements individually protected by a cryptographic security code being a digital coupon;
processing the order acceptance request based on pre-programmed criteria, including authentication of the cryptographic security codes and examination of the modular elements of the discrete message individually protected by the cryptographic security codes; and
based on the processing of the order acceptance request, transmitting to the client computer an order acceptance response based on the pre-programmed criteria, the order acceptance response comprising a discrete message transmitted during a negotiation phase of a transaction that includes a plurality of modular elements whose individual integrity is protected by cryptographic security codes embedded within each of the modular elements;
further comprising the steps of determining whether a coupon holder is authorized to use the digital coupon and accepting the digital coupon at the server computer only if the coupon holder is authorized to use the digital coupon.

44. The method of claim 43 further comprising receiving information at the server computer provided by the client computer concerning identify of the coupon holder.

45. The method of claim 44 further comprising authenticating authority of the client computer, at the server computer, by virtue of a two-way-authenticated SSL connection.

46. The method of claim 44 wherein authenticating authority of the client computer is performed using a basic authentication method.

47. The method of claim 44 wherein authenticating authority of the client computer is performed using a client certificate.

48. A method of processing order acceptance requests in an electronic commerce system, comprising a client computer and a server computer interconnected by a public packet switched communications network, the method comprising:
receiving at the server computer an order acceptance request transmitted by the client computer comprising a plurality of terms or conditions of a proposed offer for a purchase, the order acceptance request comprising a discrete message that includes a plurality of modular elements whose individual integrity is protected by cryptographic security codes embedded within each of the modular elements, at least one of the modular elements individually protected by a cryptographic security code being a digital coupon;
processing the order acceptance request based on pre-programmed criteria, including authentication of the cryptographic security codes and examination of the modular elements of the discrete message individually protected by the cryptographic security codes; and
based on the processing of the order acceptance request, transmitting to the client computer an order acceptance response based on the pre-programmed criteria, the order acceptance response comprising a discrete message transmitted during a negotiation phase of a transaction that includes a plurality of modular elements whose individual integrity is protected by cryptographic security codes embedded within each of the modular elements;

wherein the cryptographic security codes are embedded within respective ones of the plurality of modular elements.

49. A method of processing order acceptance requests in an electronic commerce system, comprising a client computer and a server computer interconnected by a public packet switched communications network, the method comprising:

receiving at the server computer an order acceptance request transmitted by the client computer comprising a plurality of terms or conditions of a proposed offer for a purchase, the order acceptance request comprising a discrete message that includes a plurality of modular elements whose individual integrity is protected by cryptographic security codes embedded within each of the modular elements, at least one of the modular elements individually protected by a cryptographic security code being a digital coupon;

processing the order acceptance request based on pre-programmed criteria, including authentication of the cryptographic security codes and examination of the modular elements of the discrete message individually protected by the cryptographic security codes; and based on the processing of the order acceptance request, transmitting to the client computer an order acceptance response based on the pre-programmed criteria, the order acceptance response comprising a discrete message transmitted during a negotiation phase of a transaction that includes a plurality of modular elements whose individual integrity is protected by cryptographic security codes embedded within each of the modular elements;

wherein the cryptographic security codes are digital signatures.

50. A method of processing order acceptance requests in an electronic commerce system, comprising a client computer and a server computer interconnected by a public packet switched communications network, the method comprising:

receiving at the server computer an order acceptance request transmitted by the client computer comprising a plurality of terms or conditions of a proposed offer for a purchase, the order acceptance request comprising a discrete message that includes a plurality of modular elements whose individual integrity is protected by cryptographic security codes embedded within each of the modular elements, at least one of the modular elements individually protected by a cryptographic security code being a digital coupon;

processing the order acceptance request based on pre-programmed criteria, including authentication of the cryptographic security codes and examination of the modular elements of the discrete message individually protected by the cryptographic security codes; and based on the processing of the order acceptance request, transmitting to the client computer an order acceptance response based on the pre-programmed criteria, the order acceptance response comprising a discrete message transmitted during a negotiation phase of a transaction that includes a plurality of modular elements whose individual integrity is protected by cryptographic security codes embedded within each of the modular elements;

wherein the cryptographic security codes are message authentication codes.

* * * * *